May 1, 1951 R. O. BOHANNON ET AL 2,551,238
PNEUMATIC TIRE TREAD
Original Filed Feb. 19, 1942 2 Sheets-Sheet 2
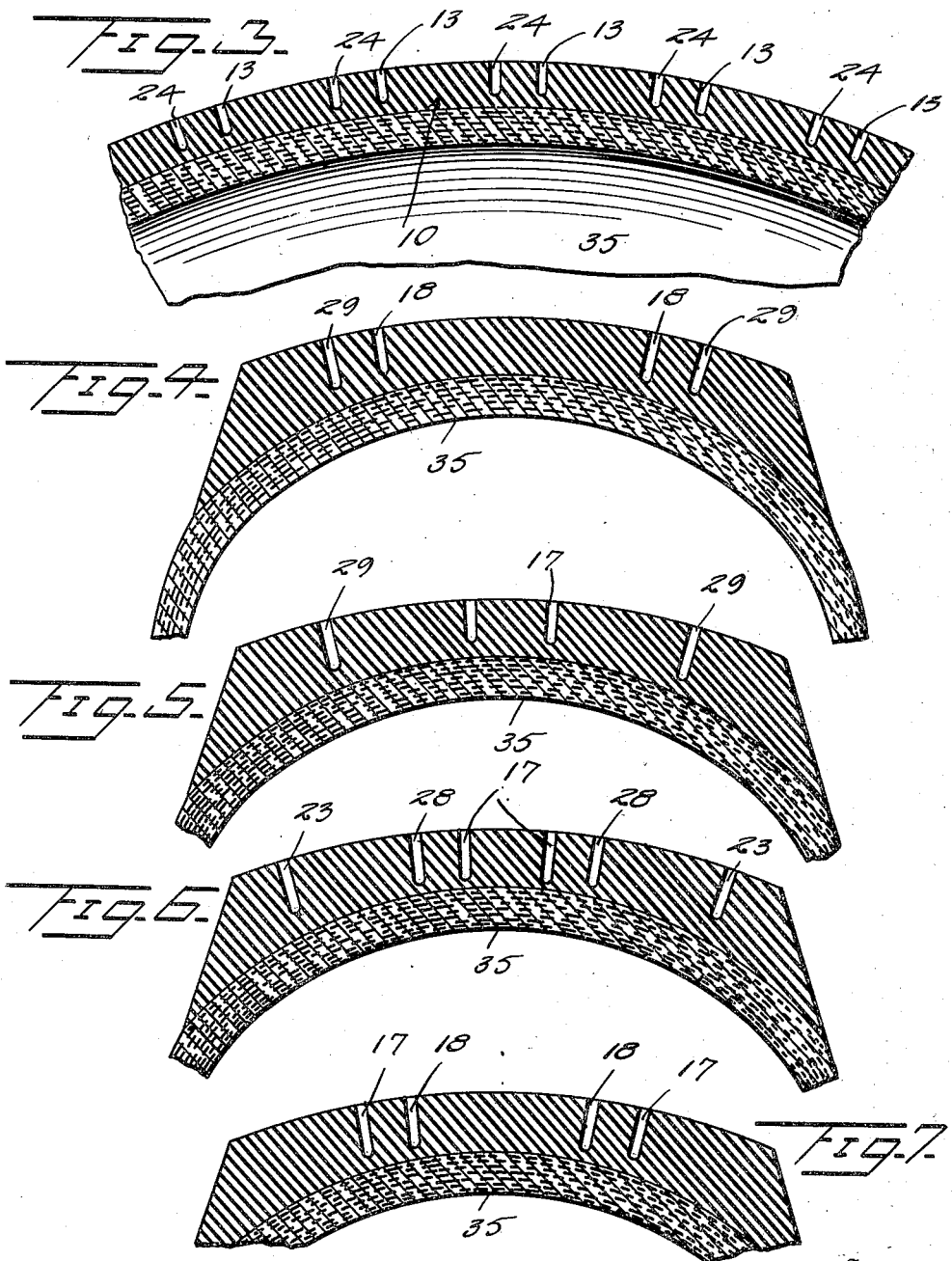
Inventors
R. O. Bohannon
R. V. Moore
F. F. Brooks
By L. F. Randolph Attorney Patented May 1, 1951

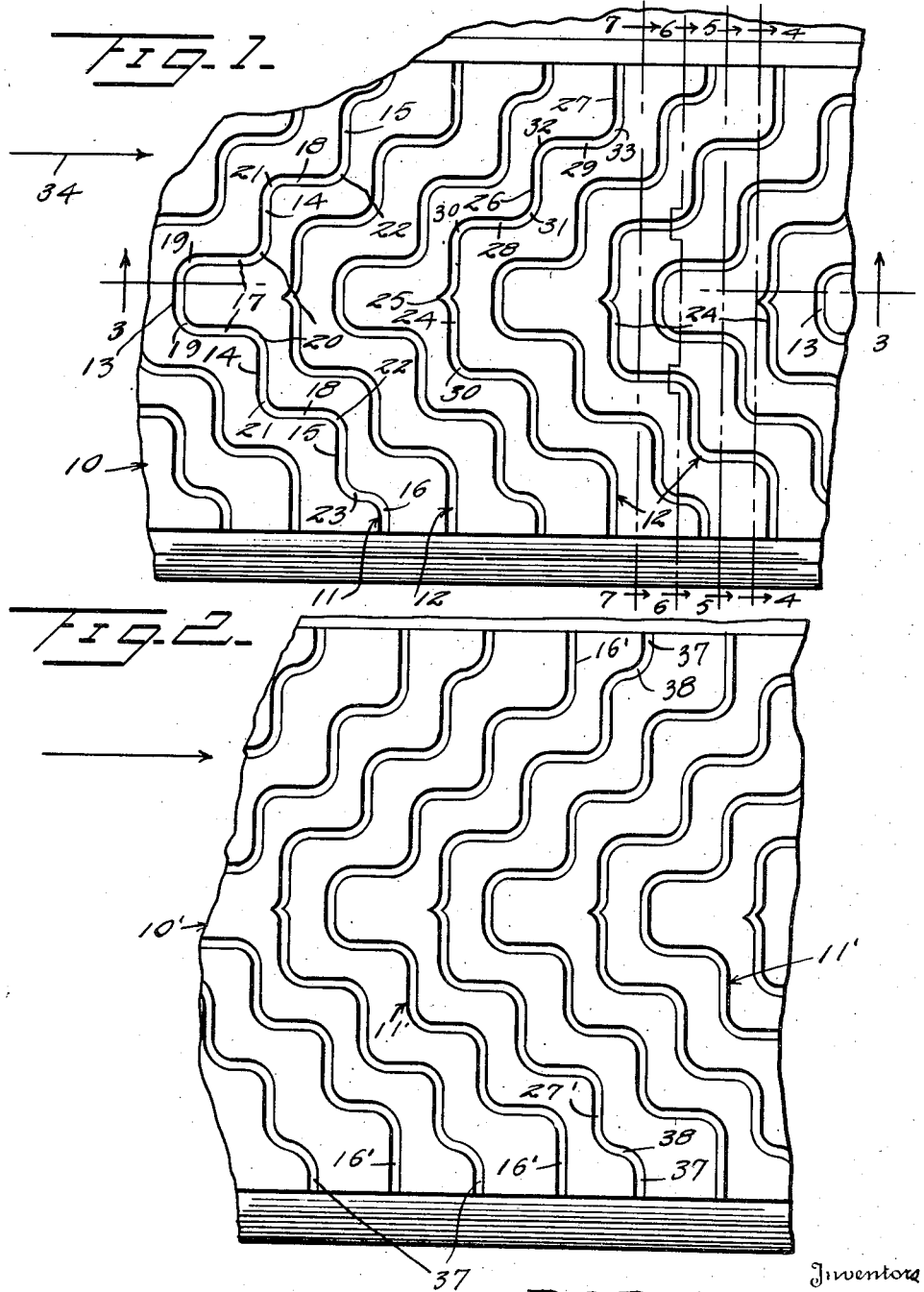

2,551,238

UNITED STATES PATENT OFFICE 2,551,238

PNEUMATIC TIRE TREAD

Richard O. Bohannon, Robert V. Moore, and Frank E. Brooks, Yakima, Wash.

Substituted for application Serial No. 431,584, February 19, 1942. This application June 24, 1946, Serial No. 678,798

5 Claims. (Cl. 152—209)

This invention relates to improvements in pneumatic tires and more particularly to improved tread portions for such tires, the same being a substitute application predicated on application, Serial Number 431,584, filed February 19, 1942, now abandoned.

More particularly, it is an aim of the invention to provide a tread portion which will have an initial flexibility followed by a subsequent firmness in all directions when subjected to compressional or torsional strains, to facilitate the steering and to cause the tire to pass more readily over irregularities in the road surface.

Another aim of the invention is to provide a tread construction which will afford good traction on dry road surfaces and which will effectively grip the road surfaces covered with water, ice or snow, and which will produce a squeegee action on wet, snow or ice covered surfaces when the brakes are applied.

Still another aim of the invention is to provide a tread which will produce no vacuum pockets, which will be quiet in operation, and which will be relatively free from the picking up of small objects such as pebbles and nails.

Other objects and advantages of the invention will hereinafter become more fully apparent from the following description of the drawings, which illustrate preferred embodiments thereof, and wherein:

Figure 1 is a fragmentary top plan view of the upper part of a pneumatic tire provided with the tread portion;

Figure 2 is a similar view of a larger size tire;

Figure 3 is a longitudinal sectional view taken substantially along the plane of the line 3—3 of Figure 1;

Figures 4, 5, 6 and 7 are transverse sectional views taken substantially along the planes of the lines 4—4, 5—5, 6—6 and 7—7, respectively;

Figure 8 is a fragmentary sectional view of the tread portion showing one of the grooves thereof, as it will appear under pressure, and Figure 9 is a similar view, but showing the groove in its normal position, and of a slightly modified shape.

Referring more particularly to the drawings, wherein like reference characters designate like or corresponding parts throughout the different views, and referring particularly to Figures 1, 3 to 8, 10 designated generally the tread portion of a pneumatic tire, constructed in accordance with the invention and which, as usual, is formed of rubber.

The tread portion 10, as best seen in Figure 1, is provided with a plurality of grooves 11 and a plurality of grooves 12 which are arranged alternately around the entire circumference of the tread portion 10, and each of which extends from side to side of the tread portion 10 and is disposed generally transversely thereof.

Each of the grooves 11 includes a transversely disposed intermediate portion 13 which is disposed centrally of the side edges of the tread portion and on each side of the center of the tread portion 10, said groove 11 is provided with staggeredly arranged transverse portions 14, 15 and 16 which are arranged in stepped relationship to the portion 13. Each of the grooves 11 is also provided, on each side of its longitudinal center, with two staggeredly arranged longitudinal portions 17 and 18. The ends of the transverse portion 13 are connected to complementary end of the portions 17 by arcuately-shaped groove portions 19 and said portions 13, 17 and 19 combine to form a substantially U-shaped intermediate portion of the groove 11. The opposite ends of the portions 17 are connected with the inner ends of the groove portions 14 by similar curved or arcuately shaped portions 20, corresponding to the portions 19. The remote ends of groove portions 14 are connected to corresponding ends of the portions 18 by groove portions 21, corresponding to portions 19. The inner ends of the portions 15 are connected to the opposite ends of portions 18 by curved portions 22, corresponding to the portions 20. The opposite ends of the portions 15 are connected to the inner ends of the portions 16 by substantially S-shaped groove portions 23. The remote ends of the groove portions 16 open outwardly of the side edges of the tread portion 10 and said portions 16 are substantially shorter in length than the portions 13, 14 and 15 or the portions 17 and 18.

The grooves 12 each include an intermediate transverse portion 24 having a point 25, intermediate of the ends thereof. On each side of the center of the tread portion 10, said groove 12 is provided with staggered transverse portions 26 and 27 which are arranged in stepped relationship to one another and to the intermediate portion 24. Likewise, on each side of the longitudinal center of the tread portion 10, the groove 12 is provided with two staggeredly arranged longitudinal portions 28 and 29. Complementary ends of the portions 28 are connected to the ends of the intermediate portion 24 by curved groove portions 30. The opposite ends of the portions 28 are connected with the inner ends of the portions 26 by oppositely curved groove portions 31. The remote ends of the portions 26 connect with the portions 29 by curved groove portions 32, and the inner ends of the groove portions 27 connect with opposite ends of the groove portions 29 by curved groove portions 33. The remote ends of the groove portions 27 open outwardly of the side edges of the tread portion 10 and said portions 27 are longer than the portions 16 and are substantially the same length as the portions 26, 28 and 29. Likewise, the portion 24 of each groove 12 is substantially longer than the portion 13 of the grooves 11 and the points 25 of the grooves 12 project in a direction opposite to the groove portions 28.

As best seen in Figure 1, the grooves 11 and 12 are disposed in relatively close proximity so as to extend into each other, or in other words, so that the end portions of the grooves 11 overlap the intermediate portion of the grooves 12 and conversely. As seen in Figure 1, the arrangement of the various adjacently disposed portions of the grooves 11 and 12 is such that the solid rubber portion between certain adjacent groove portions is relatively narrow while other solid portions are relatively wide.

The tread portion 10 is adapted to be turned in the direction as indicated by the arrow 34 in Figure 1 so that the ends of the grooves 11 and 12 will form the leading portions thereof, when said tread portion is turning so as to be moving in a forward direction with relationship to a vehicle with which it is associated, and consequently the intermediate portions of the grooves 11 and 12 will constitute the trailing parts thereof.

Due to the fact that the grooves 11 and 12 extend only longitudinally or transversely for short distances, the tendency of the tread portion 10 to follow along a rut or break in a roadway, the edge of a roadway or a street car rail is minimized. Likewise, when anti-skid chains are used over the tread portion 10, no appreciable damage will be done thereto as there are no projecting portions of the tread which might be torn off by the chains. It will also be readily apparent that the grooves 11 and 12 only occupy a small percentage of the entire area of the tread portion 10 so that the tread portion 10 is composed of a greater amount of rubber than ordinary tread portions and will therefore naturally give a greater amount of wear without sacrificing the traction provided.

Heating of the tread portion of the tire is reduced to a minimum, due to the fact that the resistance to normal, necessary flexing is reduced by the construction of the tread, although firmness to resist heavy shock is provided for by the compactness of the tread which results from the grooves being closed by normal flexing of the tread 10 as it engages the road surface, as illustrated in Figure 8. Whereas the side walls of the grooves 11 and 12 are substantially parallel, as seen in Figures 3 to 7, when the tire of which the tread portion 10 forms a part, is inflated but not subject to external pressure of torsional stress, when a part of the tread portion is subjected to external pressure or torsional stress, the grooves 11 and 12 will close or substantially close as seen in Figure 8. However, this will not produce a vacuum, due to the fact that various portions of each of the grooves 11 and 12 receive and are released from the external pressure at different times so that at no time would all parts of any one of the grooves 11 and 12 be closed, as seen in Figure 8. The compactness of the tread portion 10 with the grooves closed, as seen in Figure 8, is such as to render the tread portion highly resistant to entry and damage by sharp objects such as stone, curves, crushed rocks and worn rails. Furthermore, the tread portion 10 will retain a strong grip on the carcass 35 of the tire under severe torsional strain because only a small portion of the tread is subjected to severe stress at the position of the grooves, at any given time.

Due to the fact that both halves of the tread portion 10, on each side of the circumferential center thereof, are conversely identical, there will be no tendency to throw the tire, of which the tread portion 10 forms a part, to either the right or the left under torsional or brake strain. Also, the width of the grooves 11 and 12 is sufficiently small so that they will not pick up and throw gravel and small stones.

If desired, instead of having the side walls of the grooves 11 and 12 substantially parallel, said side walls can diverge outwardly, as indicated at 36 in Figure 9.

The construction of the grooves 11 and 12 may be varied slightly for tires of different sizes, and in Figure 2, a wider tread portion 10', for use on a larger size tire than the tread portion 10, is shown to illustrate this. The grooves 11' of the tread portion 10' are substantially the same as the grooves 11, except that the portions 16' thereof are of greater length than the portions 16. The grooves 12' of the tread portion 10' differ from the grooves 12 in that portions 27' thereof have their remote ends terminating in spaced relationship to the side edges of the tread portion 10' and therebeyond the grooves 12' are provided with groove portions 37, similar to the groove portions 16 and which are connected at their inner ends to the outer ends of the groove portions 27' by S-shaped groove portions 38, corresponding to the groove portions 23. The groove portions 37, like the groove portions 16, open outwardly of the side edges of the tread portion. Tread portion 10' is adapted to turn in the direction as indicated by the arrow 34'.

It will be readily apparent that the tread portions 10 and 10', when operating over a slippery surface, will function similarly to a squeegee and will tend to force the moisture on the surface laterally outwardly on both sides to remove a substantial portion of the moisture and to thus condition the surface so that it will afford better traction.

Due to the alternate transverse and longitudinal disposition of the grooves, with curved connecting portions, flexibility is enhanced in all directions. Further, due to the relatively narrow grooves and the corrugated or serpentine V-shaped and overlapping details, this form of tread affords a firm, chatterless resistfulness in all directions of flexation.

Further, the particular corrugated or serpentine pattern of the tread results in greater enhanced strength for heavy torsions combined with a multiplicity of transverse and longitudinal gripping edges. Further, this tire can be used in reverse directions, as when switching tires on vehicles, because each lateral half of the tread duplicates its other half.

Due to the V-form of the individual tread, with the apices of the V-forms pointing forward, the tendency is that the V-grooves will sweep themselves clear of water and other possible accumulations under braking torsion, to the end that the gripping power is much more enhanced on wet macadam or similar smooth surfaces than is possible with present day tread formations.

Further, due to the fact the channels extend entirely across the tread surface, circulation of air is promoted, dissipating the possible accumulation of heat, with result in deterioration of the tire. Moreover, due to the very narrow channels, there is less vertical vibration and consequential wear and tear on the vehicle in general.

Various modifications and changes are contemplated and may obviously be resorted to, provided they fall within the spirit and scope of the invention as hereinafter defined by the appended claims, as only preferred embodiments thereof have been disclosed.

We claim as our invention:

1. A resilient tire including a tread portion, said tread portion being formed with serpentine disposed channels extending across the traction surface of said tread portion, and describing generally interlapping V-shaped channelled arrangements, the apices of the V-shaped channelled arrangements being of interlapping U-shape.

2. A resilient tire including a tread portion, said tread portion being formed with serpentine disposed channels extending across the traction surface of said tread portion, and describing generally interlapping V-shaped channelled arrangements, the apices of the V-shaped channelled arrangements being of interlapping U-shape, with alternate U-shaped portions having pointed groove extensions.

3. A resilient tire including a tread portion, said tread portion being formed with serpentine disposed channels extending across the traction surface of said tread portion, and describing generally interlapping V-shaped channelled arrangements, the apices of the V-shaped channelled arrangements being of interlapping U-shape, with alternate U-shaped portions having pointed groove extensions, the last mentioned U-shaped channelled portions being larger than correspondingly shaped portions of adjacent channels.

4. A tread form for resilient tires wherein the tire is formed with channels stepped inwardly from opposite side edges of the tire toward the same general longitudinal direction of the tire and meeting at the longitudinal medial portion of the tire.

5. A tread form for resilient tires wherein the tire is formed with channels stepped inwardly from opposite side edges of the tire toward the same general longitudinal direction of the tire and meeting at the longitudinal medial portion of the tire, the steps being disposed alternately in longitudinal and transverse directions of said tire.

RICHARD O. BOHANNON.
ROBERT V. MOORE.
FRANK E. BROOKS.

REFERENCES CITED

The following references are of record in the file of this patent:

UNITED STATES PATENTS

| Number | Name | Date |
|---|---|---|
| D. 112,185 | Anderson | Nov. 15, 1938 |

FOREIGN PATENTS

| Number | Country | Date |
|---|---|---|
| 818,107 | France | 1937 |